(12) United States Patent
Rolf et al.

(10) Patent No.: US 8,787,221 B2
(45) Date of Patent: Jul. 22, 2014

(54) METHOD OF TRANSMITTING, RECEIVING, RECORDING, PLAYING AND DISPLAYING WEATHER RADIO

(75) Inventors: Haupt Rolf, Chaiwan (HK); Allan McCormick, La Crescent, MN (US)

(73) Assignee: La Crosse Technology, Ltd., La Crosse, WI (US)

( * ) Notice: Subject to any disclaimer, the term of this patent is extended or adjusted under 35 U.S.C. 154(b) by 675 days.

(21) Appl. No.: 12/822,252

(22) Filed: Jun. 24, 2010

(65) Prior Publication Data

US 2011/0045761 A1 Feb. 24, 2011

Related U.S. Application Data

(63) Continuation-in-part of application No. 12/466,521, filed on May 15, 2009, now Pat. No. 8,406,162, which is a continuation-in-part of application No. 12/057,761, filed on Mar. 28, 2008, now Pat. No. 8,339,901.

(60) Provisional application No. 61/220,041, filed on Jun. 24, 2009, provisional application No. 61/019,299, filed on Jan. 7, 2008, provisional application No. 60/982,096, filed on Oct. 23, 2007, provisional application No. 60/981,862, filed on Oct. 23, 2007, provisional application No. 60/982,137, filed on Oct. 23, 2007.

(51) Int. Cl.
*H04W 4/00* (2009.01)

(52) U.S. Cl.
USPC ........................................ 370/310; 455/404.2

(58) Field of Classification Search
None
See application file for complete search history.

(56) References Cited

U.S. PATENT DOCUMENTS

| 4,839,645 | A | * | 6/1989 | Lill ........................... 340/870.17 |
| 5,574,999 | A | * | 11/1996 | Gropper ..................... 455/186.1 |
| 6,678,215 | B1 | | 1/2004 | Treyz et al. |
| 6,751,164 | B1 | | 6/2004 | Sekiguchi |
| 6,876,600 | B2 | | 4/2005 | Ito et al. |
| 6,967,900 | B2 | | 11/2005 | Chapman |
| 6,970,924 | B1 | | 11/2005 | Chu |
| 7,376,509 | B2 | | 5/2008 | Endo |
| 7,777,612 | B2 | * | 8/2010 | Sampson et al. ........... 340/426.1 |
| 2002/0012290 | A1 | | 1/2002 | Shinagawa |
| 2003/0121480 | A1 | * | 7/2003 | Grimsley et al. ............. 119/721 |

(Continued)

OTHER PUBLICATIONS

PCT/US2008/080953, International Preliminary Report on Patentability, dated May 6, 2010.

*Primary Examiner* — Hassan Kizou
*Assistant Examiner* — Roberta A Shand
(74) *Attorney, Agent, or Firm* — Banner & Witcoff, Ltd.

(57) ABSTRACT

A receiver may receive alerts from a radio-broadcast following a tone or other indication preceding each alert, for example, the National Oceanic and Atmospheric Administration's (NOAA) broadcasted weather alerts. Received alerts may be recorded and stored for future playback to an end user, and the receiver may indicate to the user that an alert has been stored, varying the type of indication according to the type of alert stored. The receiver may record alerts specific to one or more zip codes, geographic regions, Global Positioning System (GPS) coordinates, Federal Information Processes Standards (FIPS) codes, Specific Area Messaging Encoding (SAME) profiles, or other user location data. The user may then select locations and type of alerts to be replayed. Additionally, the receiver may be used in conjunction with other co-located devices to provide information to an end user through a variety of methods and devices.

20 Claims, 4 Drawing Sheets

(56) References Cited

U.S. PATENT DOCUMENTS

| | | | |
|---|---|---|---|
| 2003/0203715 A1* | 10/2003 | Onodera | 455/3.04 |
| 2004/0183687 A1* | 9/2004 | Petite et al. | 340/601 |
| 2005/0108213 A1 | 5/2005 | Riise | |
| 2005/0143049 A1* | 6/2005 | Hoke | 455/404.2 |
| 2005/0174889 A1 | 8/2005 | Marcantonio | |
| 2005/0232086 A1 | 10/2005 | Jiddou | |
| 2006/0095210 A1 | 5/2006 | Chan | |
| 2007/0149242 A1* | 6/2007 | Kim et al. | 455/525 |
| 2007/0296575 A1* | 12/2007 | Eisold et al. | 340/539.16 |

\* cited by examiner

METHOD OF TRANSMITTING, RECEIVING, RECORDING, PLAYING AND DISPLAYING WEATHER RADIO

RELATED APPLICATIONS

The present application is a non-provisional of U.S. Provisional Patent Application No. 61/220,041, entitled "Method of Transmitting, Receiving, Recording, Playing and Displaying Weather Radio," filed Jun. 24, 2009, the contents of which are incorporated herein by reference in their entirety for all purposes. This application is a continuation-in-part of U.S. patent application Ser. No. 12/466,521, filed May 15, 2009, which is a continuation-in-part of U.S. patent application Ser. No. 12/057,761, entitled "Display Station," filed on Mar. 28, 2008, which claims priority to U.S. Provisional Patent Application No. 60/982,137, entitled "Method of Transmitting, Receiving and Forwarding Data in a Low Power Network System," to Allan McCormick and Rolf Haupt, filed on Oct. 23, 2007, U.S. Provisional Patent Application No. 60/982,096, entitled "Method of Transmitting, Receiving and Displaying/Playing Data such as Internet Radio Time, and Music on a Network System," to Allan McCormick and Rolf Haupt, filed on Oct. 23, 2007, U.S. Provisional Patent Application No. 60/981,862, entitled "Method and Apparatus of Transmitting, Receiving, Displaying and Playing Weather Data," to Allan McCormick and Rolf Haupt, filed on Oct. 23, 2007, and U.S. Provisional Patent Application No. 61/019,299, entitled "Method and Apparatus of Transmitting, Receiving, Displaying and Playing Weather Data," to Rolf Haupt and Allan McCormick, filed on Jan. 7, 2008, all of which are herein incorporated by reference in their entirety.

FIELD OF INVENTION

The present disclosure is generally related to electronic systems such as wide area network based weather communication systems including weather radio.

BACKGROUND

Weather radios are used by consumers to scan radio frequencies, such as 162.400-162.550 MHz, which are dedicated for broadcasting weather and other alerts. These dedicated frequencies are not in a range that most conventional radios can receive, and thus a consumer must have a weather radio or other similar device to monitor these broadcasts. Organizations such as the National Oceanic and Atmospheric Administration (NOAA) broadcast such alerts to be received by these devices. Current weather radio devices, however, are required to be always on and always listened to in order to be useful. This has reduced the applicability of these devices for the average consumer. Further, the interface for weather radios have made them less than ideal platforms for communicating information. For example, the voice messages are often not particularly useful for those users who are not intimately familiar with the geographic region.

BRIEF SUMMARY

The current disclosure relates to a method and apparatus for receiving radio-broadcasted alerts and presenting them in a useful format for an end user.

In accordance with one or more aspects of the disclosure, a device may receive data through any number of receivers, including a receiver and a wide area network receiver, and record the message for later playback. For example, in certain aspects of the disclosure, a tone may be played for 10, 20, or 30 or more seconds preceding a weather alert. This tone may be utilized in order to enable weather radios with useful battery life to be built. Currently, the weather radios must be constantly on and constantly listened to in order to avoid missing an alert. The use of the tone allows battery operated weather radios to turn on once every 10 to 30 seconds and "listen" for the tone. If the tone is not present, the weather radio shuts off to conserve battery power. If the tone is present, the weather radio turns on and receives the weather alert.

In further embodiments of the disclosure, the weather alert is recorded and stored in the weather radio. In this manner, the user does not have to be continually listening to the weather radio. Once the message is recorded, a visual and/or audible indication is provided to the user that there is a weather alert message waiting. The visual and/or audible indication may be different for different weather alerts. For example, there may be a tornado icon (flashing or stable), a severe thunderstorm warning icon (flashing or stable), flood warning icon (flashing or stable), etc. Additionally, there may be a user input device coupled to the icons enabling the user to play the alert associated with the icon. In embodiments of the disclosure where such icons are utilized, they may be liquid crystal display (LCD) icons and/or icons printed on the device's casing with illuminations next to the icon.

In still further embodiments of the disclosure, the weather radio displays a map or satellite image of the user's current location along with various points of interest such as nearby cities. Overlaid on this map and/or satellite image are various storm path Polygons provided by the weather alerts. This allows the user to determine visually whether or not the user is in the storm path. For example, the user may input a zip code or longitude and latitude coordinates (or have it determined through a built-in GPS module) and then have the device indicate whether or not the user is in the storm path as well as a time to arrival of the storm. Furthermore, the device may be configured to allow a user to see visually whether or not the weather radio's location (or another selectable location) is in the storm path. The weather radio may also be configured to provide the user with directions (detour directions) to exit the storm path. The user may zoom in on the current location to see specifics as to time to arrival or zoom out of the current location zoom level to see a global picture of the storm path.

Additional embodiments of the disclosure include a user interface which displays the various weather alerts that are potentially available and allows the user to select and deselect individual alerts. Further, the user can enter one or multiple zip codes for which alerts may be available. Additionally, the weather alerts may be recorded for each of the zip codes and scrolled through so the user may see which alerts are associated with which zip codes. In addition, the user may be able to individually select the alerts that are associated with each zip code. For example, a user may not be interested in flooding where his main home is located in the mountains, but may be keenly interested in flooding for his beach house.

In still further aspects of the disclosure, a stable or moving icon may be used as illustrative of various details of interest. For example, where the user's location map is shown on the screen, one or more tornado icons may appear on the screen and may move across the screen depending on the storm's track. In these embodiments, the user's location is fixed and the storm's location is shown as moving relative to the user's location. Alternately, both the user's location and the storm's track or other icon may be shown as moving.

In additional embodiments of the disclosure, the device may include other co-located devices for, for example, measuring local weather conditions and sending and receiving weather data to locally connected devices. For example, the weather radio may reside in the user's main home and be "always on" and plugged in to wall power. Display devices may be located throughout the home that receive data from the main weather radio and are battery powered. These devices display weather alerts every few 10s of seconds or minutes. They wake up, determine if a weather alert has been recorded in the main weather radio, and if so, then provide the alert in a remote location. In this manner, the main weather radio may be located in a den in the house and the satellite display devices may be located throughout the home, garage, barn, boat, and office.

In additional embodiments of the disclosure, the device may also be configured to plug into a cradle. The cradle will keep the device always charged. In this manner, the user may simply take the device, for example, to a soccer game, swimming match, or boating outing. Thus, the alerts will be available at the external location when needed. The device may also be configured to include other desirable features and data such as a radio, alarm clock, indoor and outdoor temperature and min/max temperatures. In one embodiment, the device could be configured with a similar form factor to a PDA or so called "blackberry" like device.

In still further embodiments of the disclosure, once the device is removed from the cradle, it may be configured to turn on or off certain function such as the receipt of outdoor temperature and/or the feeding of data to remote weather display devices.

In still further embodiments of the disclosure, the user may choose the particular weather radio tower that is closer and the display can be configured to display the name/location of the tower selected.

In additional aspects of the disclosure, a weather radio tower is selected using a combination of a signal strength indicator (e.g., RSSI Radio Signal Strength Indicator) taken in combination with a measurement of the signal to noise ratio of the signal. In this way, a weaker but low noise signal may be selected over a very strong, but very high noise signal. Hence the user can be provided the optimal signal. In still further embodiments, two or more signal icons will be displayed with the user able to select between the icons. As an example, the device may receive seven different signals from different weather radio towers, and may be configured to display one or more different icons for each of the different signals. For instance, two icons might be displayed for each signal: a first signal strength indicator icon, and a second signal-to-noise ratio icon. In other examples, one icon may be displayed without the other, or a combination icon may be displayed that combines measurements of signal strength and signal-to-noise ratio in a single indicator.

In further embodiments of the disclosure, the user is provided with various predetermined profiles. In this way, the user programming of the Specific Area Messaging Encoding (SAME) profiles are simplified to allow a user to select which counties and watches the user is interested in viewing/hearing. The user can simply scroll through the default profiles such as a travel profile, a home profile, a boating profile, a freeze profile, a tornado profile, a vacation home profile, and a hurricane profile. The user can simply select the profile and everything will be set.

According to additional embodiments of the disclosure, the user interface of the weather radio may provide one or more systems to allow the user to search for and enter current locations for receiving alerts. As discussed above, the user may enter a zip code for a current location to subscribe to weather alerts applicable to that location. Additionally, the device may use location codes, such as Federal Information Process Standards (FIPS) codes for the US, or another set of location codes corresponding to another country. For example, the user interface of the weather radio may display a selectable list of states for the user. After the user selects a state from the list, the user interface may be updated to allow the user to select a county from the selected state, and thereafter to select a portion of the county. Based on this information, the weather radio accesses an internal storage mapping to identify the proper FIPS code (or other location code) corresponding to the location, so that the location code can be associated with the weather radio and/or one of the user profiles on the radio (e.g., home, work, current, travel, vacation, grandmother's house, friend's house, etc.). In other embodiments, the user interface may first present a list of countries, followed a list of states/provinces, followed by a list of cities, and so on. In other embodiments, rather than hierarchical menus, the weather radio may present a flat list of the location names (e.g., city/state combinations, county/state combinations, etc.) and allow the user to scroll through and select the desired location from the list. In certain other examples, after the user has selected the location name, the weather radio will present the FIPS code (or other location code), and await for a user entry and/or confirmation of that code. In other examples, the location code (e.g., FIPS code) may be hidden from the user and the user will only see the associated location name (e.g., country, state, province, city, county, and/or county part, etc.). The weather radio may also alert the user when a location code associated with the device (e.g., the current location code for a profile) has changed in a national FIPS database. Alternatively, the weather radio might not alert the user, but may automatically update the location code in the internal storage of the weather radio. In other embodiments, the weather radio may periodically access an external FIPS database (e.g., via the Internet) to confirm that the internal list of location codes is up to date, and if not, the weather radio may automatically download the updated FIPS location code list, and replace any outdated codes associated with user profiles on the weather radio. In still other embodiments, the location codes might not be stored internally at the weather radio device. For example, the weather radio may transmit a location name to an external location code provider (e.g., FIPS database) which may determine the FIPS code corresponding to the location name and transmit the FIPS code back to the weather radio. In other examples, the weather radio might only use location names and not location codes. It may receive weather alerts from a third party capable of translating location codes into location names for the weather radio.

These and other embodiments will become more apparent from the below drawings and detailed description of the disclosure provided below.

BRIEF DESCRIPTION OF THE DRAWINGS

A more complete understanding of the features described herein and the advantages thereof may be acquired by referring to the following description by way of example in view of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

Aspects of the disclosure provide a method and apparatus for receiving radio-broadcasted alerts and presenting them in a useful format for the end user.

Figure 1:
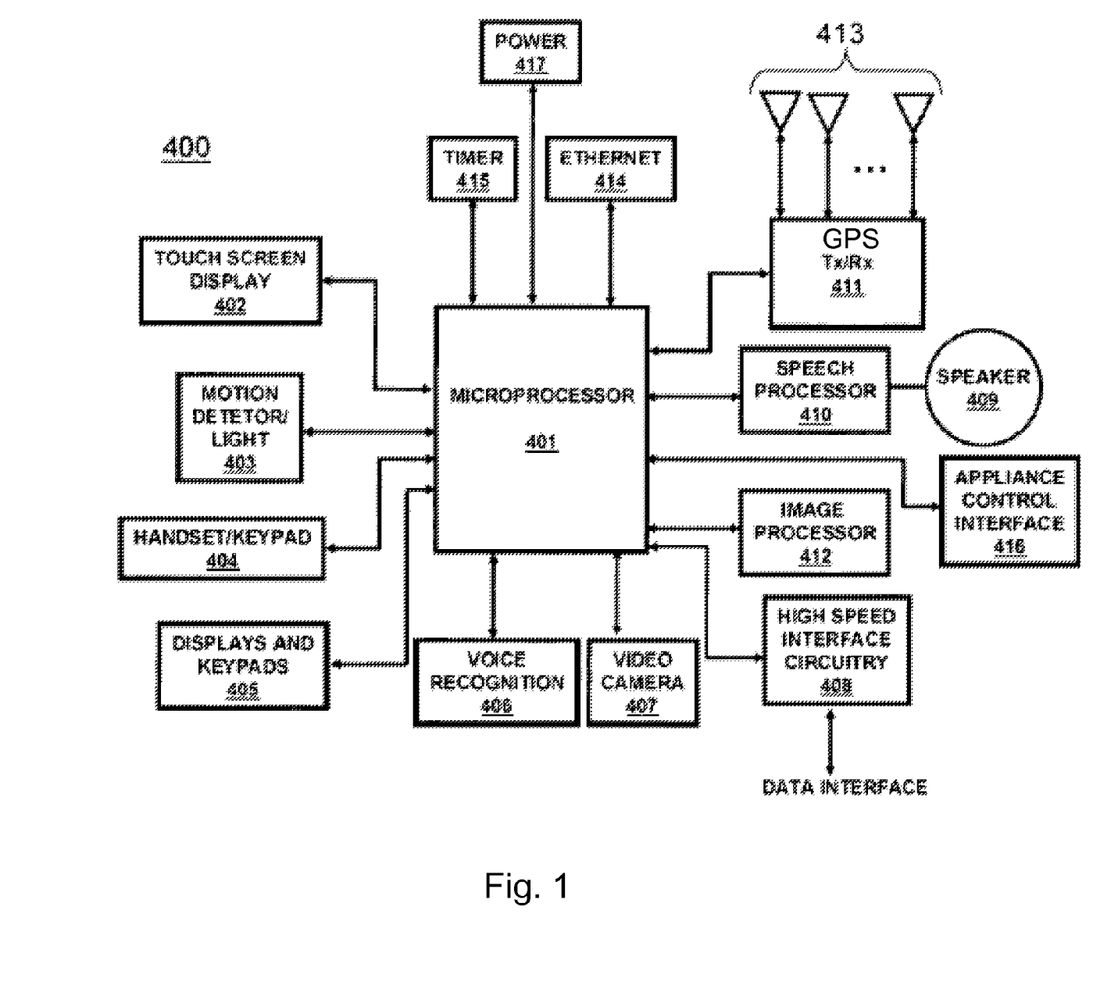
FIG. 1 shows an illustrative computer system in accordance with one or more aspects of the present invention.

Referring to FIG. 1, a block diagram of illustrative electronics is depicted for a receiver 400. The illustrative electronics include one or more computer units 401 (e.g., microprocessor/microcontroller), a power supply 417 (e.g., a battery and power regulator unit), a timer 415 (e.g., a watchdog timer), a network connection 414 (e.g., Ethernet and/or 802.11 a-g, n), a screen interface 402 (e.g., touch screen display), a motion detector, light controller, door/window sensor, infrared detector, and/or appliance control/sensor 403, a user interface control 404 (e.g. a handset or keypad), various indicators, displays, and keypads 405, voice recognition circuits 406, still and/or video camera(s) 407, data interface circuitry 408 (e.g., wired and/or wireless circuitry), signal processing circuits 412 (e.g., image processor), appliance control interface 416 (e.g., heat, window controls, bathroom heater, cooling, water heater, lighting, alarm clocks), speech processor 410 and associated audio device 409 (e.g., speakers and/or headset), various antenna transmitters and/or receivers 413 and associated receiver/transmitter (e.g., transceiver) and/or GPS circuitry 411.

The receiver 400 may be implemented in a standalone configuration and/or coupled to one or more other receivers 400. The receiver 400 may alternatively be configured as low cost display station with the minimum components for receiving and displaying information to a user. Example embodiments of the receiver include, but are not limited to, mobile or stationary weather station appliances, wall clocks or wrist watches, personal digital assistants (PDAs), mobile phones, and other mobile devices, radios, CD players, MP3 players, bedside alarms, and/or temperature display devices. Each of these example embodiments may be implemented with or without localized information, such as, for example, weather and/or traffic information.

Figure 2:
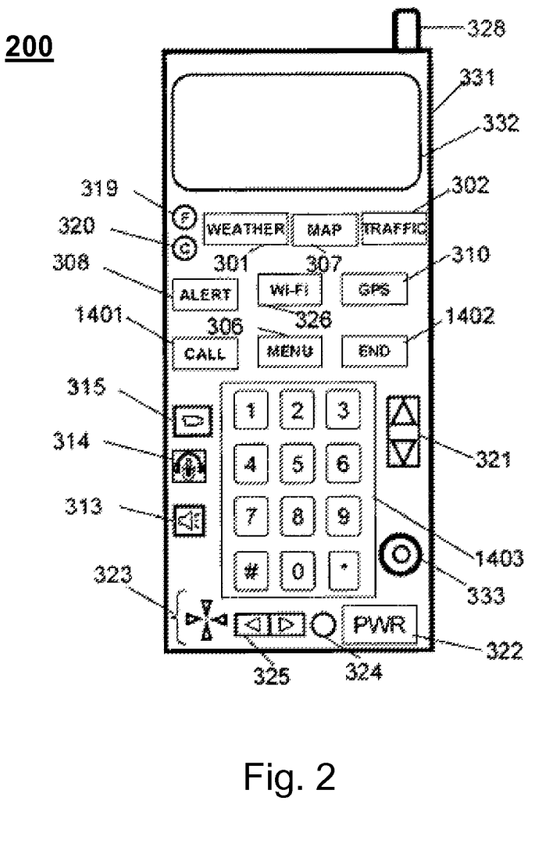
FIG. 2 shows an illustrative embodiment of a mobile receiver device in accordance with one or more aspects of the present invention.
Figure 3:
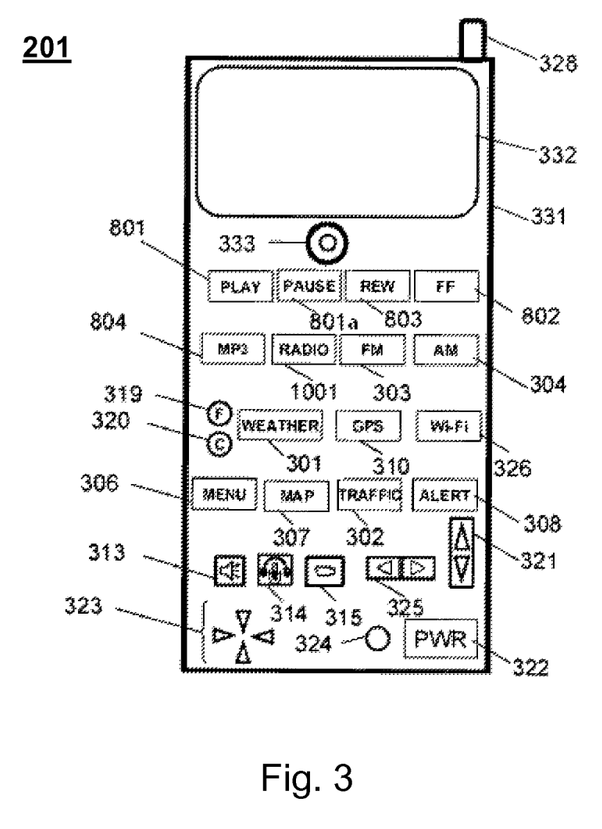
FIG. 3 shows an illustrative embodiment of a receiver device in accordance with one or more aspects of the present invention.
Figure 4:
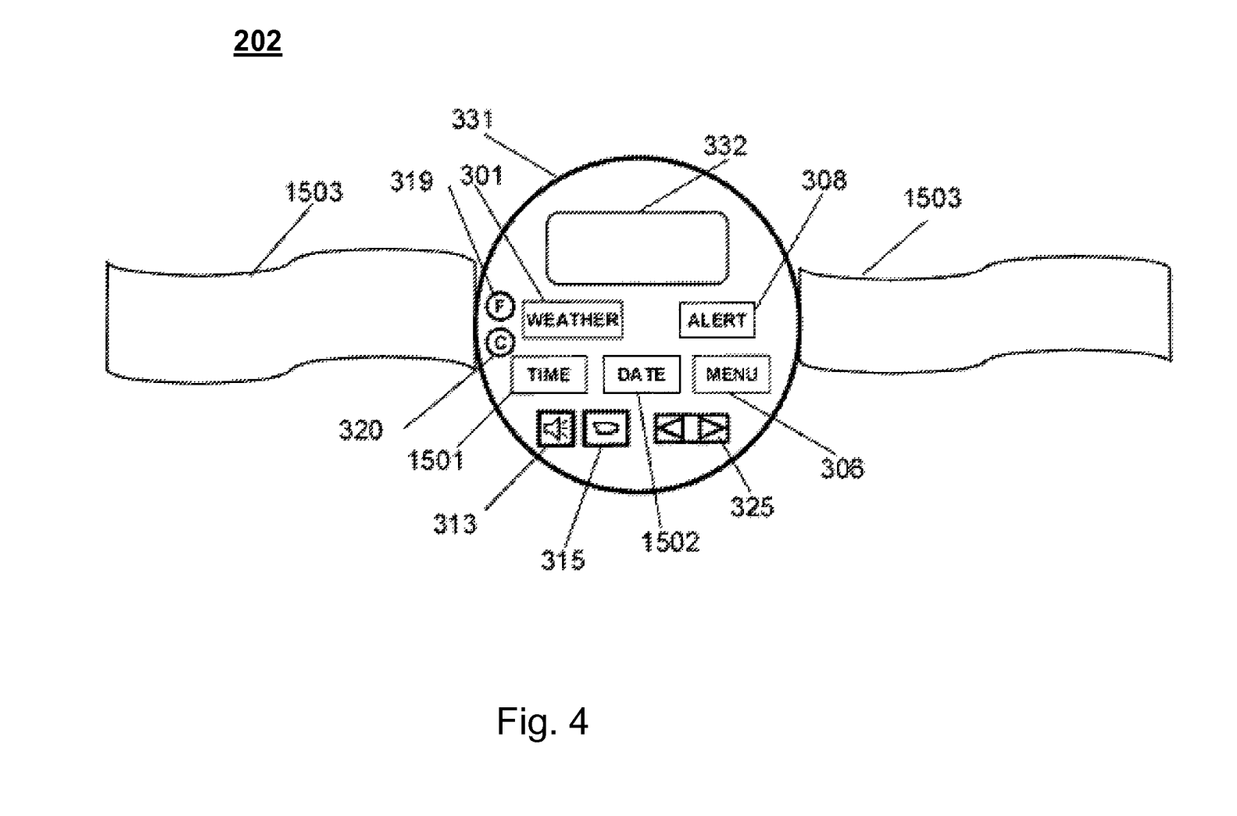
FIG. 4 shows an illustrative embodiment of a watch device in accordance with one or more aspects of the present invention.

In illustrative embodiments, the receiver 400 is configured as illustrative form factors 200, 201, and 202 as shown in FIGS. 2-4. In these examples, receiver 400 includes an outer casing 331, various user inputs (e.g. a keypad 1403, volume buttons 325, etc.), and a display screen 332 which may be a touch screen. The receiver may be continuously powered or may be turned on by depression of a power button 322. The receiver may include a LED power indicator 324 and/or simply use the screen backlighting as the power indicator. The receiver 400 may be variously configured to include weather button 301, Fahrenheit and Celsius selection buttons 319 and 320, respectively, one or more emergency light(s) 333 and/or icons 323 to provide customized alerts, speaker button 313, microphone button 314, video button 315, reset button (not shown), volume button 325, keypad 1403, GPS locating buttons 310, alert selection buttons 308, and/or other suitable user interface buttons. In addition, the device may have recording functions to record alerts either manually and/or automatically and include various associated user interface buttons including play 801, pause 801a, fast forward 802, and rewind 803. The receiver 400 may also include a map button 307 for displaying a satellite image on the device and a weather button 301 for overlaying storm alerts on the display. The receiver may have additional buttons and devices to accommodate additional features desirable in such a receiver including, but not limited to, an antenna 328, traffic button 302, call button 1401, menu button 306, end button 1402, wi-fi button 326, mp3 button 804, radio button 1001, FM/AM frequency selector buttons 303 and 304 respectively, and time and date buttons 1501 and 1502, respectively. Additionally, the various embodiments may include a band 1503 to accommodate a wrist-worn embodiment of the receiver.

In further embodiments of the disclosure, various ports may be included to include additional modules and/or other communication and/or sensor devices. For example, a GPS module 411 may be included in the receiver 400. The GPS receiver may be permanently and/or detachably mounted to the receiver 400. Where the receiver 400 including the GPS module is a weather station, the device may automatically extract weather data based on the coordinates of the GPS system. These coordinates may come from the GPS module or may be inputed by the user manually. When the coordinates are derived from the GPS module, the weather station receiver 400 may translate the GPS coordinates to zip codes and/or zip plus four codes. In either event, the receiver 400 extracts the relevant weather related data based on the location.

In an additional aspect of the disclosure, the receiver 400 may be configured to enable the user to select various options such as selecting and/or choosing an alert in which to record and/or a particular weather radio tower that is closer in which to receive radio broadcasts from.

Additionally, if there were particular NOAA weather alerts detected in the vicinity of the location of a user's home, present location, or a one or more programmable locations, these alerts may trigger an alert on the screen 332. This device may record the actual weather radio alert or used synthesized voice to generate an alert to the user.

In additional aspects of the disclosure, a user is provided with a simplified user-interface such that the user may select a particular alert. In this embodiment, based on the particular tower of the user's geographic location, certain alerts are pre-selected. That is, users who are located proximate to a tower in certain geographical areas will receive alerts that are most relevant to that area's weather conditions. For example, if the user is located proximate a tower in the midwest, certain alerts such as tornado alerts or dust storm warnings are automatically enabled, while users located proximate to a tower in coastal areas will have coastal warning alerts automatically enabled. This automatic alert filtering function may provide potential advantages to users that do not want to receive many alerts not of interest to the user, and to user that may have limited abilities to reconfigure their devices, yet still wish to receive critical alerts.

Additionally, in certain embodiments, some users may be provided a whole range of alerts. For example, civil danger warnings in the United States have become of much more interest to the general public. In one example, if the water were to become contaminated, NOAA provides a water contamination alert. Similarly, there are alerts for chemical hazards, dam break warning, contagious disease warnings and other similar alerts which may require a user to take emergency action. These alerts may take priority over other settings (e.g., sound volume) and be immediately presented to the user.

In an additional embodiment of the disclosure filters, for the alert functions may be vicariously configured. For example, the alert could be selected on a geographic basis. In alternate embodiments, the device may contain different alerts for different counties, different states, and different regions.

In still another embodiment of the disclosure, the receiver 400 may be configured to monitor the radio broadcasts for a tone or other indication preceding a weather alert such as three beeps. The device may be configured through a screen 332/402 to record and store the alert in the internal memory of a microprocessor(s) 401 and/or in an external memory (not shown). For example, certain radio broadcasts may play a tone 10, 20, or 30 or more seconds preceding a weather alert. This tone may be utilized by receivers 413 to determine when a weather alert is about to be sent. The receiver/transmitter 411 will then generate an interrupt to microprocessor 401 to "wake up" the device in order to enable weather radios with useful battery life to be built. Currently, the weather radios must be constantly on and constantly listened to in order to avoid missing an alert, and hence the microprocessor 401 and associated support circuitry must be constantly powered. The use of the tone allows battery operated weather radios to turn on once every 10 to 30 seconds and "listen" for the tone. If the tone is not present, the weather radio shuts off to conserve battery power and the microprocessor 401 goes into a sleep mode. If the tone is present, the weather radio turns on and receives the weather alert.

In further embodiments of the disclosure, the weather alert is recorded by, for example, microprocessor 401 using an analog-to-digital (A/D) converter (not shown) and stored in a memory in the microprocessor 401 and/or an external memory (not shown). In this manner, the user does not have to be continually listening to the weather radio but rather the receiver 400 performs this function automatically. Once the message is recorded, a visual and/or audible indication is provided to the user via a screen 332, speaker 313, and/or any other suitable indicator that there is a weather alert message waiting. The audible/visual indication may be different for different weather alerts and may include an icon on the screen 332 and/or an icon printed on the face of receiver 400 along with a visual indicator such as an LED. Similarly, the visual indication may be different for different weather alerts and include different icons on the screen 332 or printed on the face of receiver 400. For example, there may be a tornado icon (flashing or stable), a severe thunderstorm warning icon (flashing or stable), flood warning icon (flashing or stable), etc. on screen 332. Additionally, there may be a user input device coupled to the icons enabling the user to play the alert associated with the icon. See, for example, the play button 801 in FIG. 3.

In still further embodiments of the disclosure, the weather radio displays a map or satellite image of the user's current location along with various points of interest such as nearby cities on display 332. Overlaid on this map and/or satellite image may be various storm path polygons provided by the weather alerts and which may be enabled by a selection option on the touch screen 332 and/or using a weather overlay button such as button 301. This allows the user to determine visually whether or not the user is in the storm path. For example, the user may input a zip code or longitude and latitude coordinates (or have it determined through a built-in GPS module) and then may have the device indicate whether or not the user is in the storm path as well as a time to arrival of the storm. The device may input the zip code using a keypad 1403 and/or use the current location using button (not shown). The device may be configured to allow a user to see visually whether or not the satellite radio's location (or another selectable location) is in the storm path by, for example, using a satellite image and/or map on display 332 overlaid with a one or more storm path polygons. The weather radio may also be configured to provide the user with audio and/or graphic directions (detour directions) to exit the storm path. The user may manipulate the screen 332, for example using buttons 321, to zoom in on the current location in order to see specifics as to time of arrival of the storm, or zoom out of the current location zoom level in order to see a global picture of the storm path.

Presenting another aspect of the disclosure, the weather radio may also include a user interface on screen 332 which displays the various weather alerts that are potentially available and allows the user to select and deselect individual alerts either using the touch screen or selection buttons such as buttons 321. Further, the user can enter one or multiple zip codes for which alerts may be available using, for example, keypad 1403. Additionally, the weather alerts may be recorded for each of the zip codes and scrolled through, using, for example buttons 321 or the touch screen, so the user may see which alerts are associated with which zip codes. In addition, the user may be able to individually select the alerts that are associated with each zip code. For example, a user might not be interested in flooding where his main home is located in the mountains, but may be keenly interested in flooding for his beach house.

In still further aspects of the disclosure, an icon may be stable or moving on screen 332. For example, where the user's location map is shown on the screen, one or more tornado icons may appear on the screen and/or move across the screen depending on the storm's track. In these embodiments, the user's location may be fixed on screen 332 and the storm's location may be shown as moving relative to the user's location. Alternately, both the user's location and the storm's track may be fixed on the screen 332, or both may be shown as moving on the screen 332.

In an additional embodiment of the disclosure, the receiver 400 may include other co-located receiver devices for measuring local weather conditions, sending and receiving weather data to locally connected devices via transmitter/receiver 411, or any other task. The co-located devices may be any device that those with ordinary skill in the art will appreciate as appropriate, including, but not limited to, weather stations, clocks, alarm clocks, watches, temperature displays, telephones, personal computer computers, personal digital assistants (PDAs), and other suitable co-located devices. For example, the weather radio may reside in the user's main home and be "always on" and plugged in to wall power. In other examples, battery powered display devices may be located throughout a user's home, office, or other location, and/or on the user's person (e.g., watch device 202 in FIG. 4), and may receive data from the main weather radio. These devices may display weather alerts periodically, for example, every few seconds or minutes. In these examples, the plugged in or battery powered display devices, located remotely from a main weather radio, may periodically wake up, determine if a weather alert has been recorded in the main weather radio, and if so, then provide the alert in a remote location. In this manner, the main weather radio may be located, for example, in a den in the house and the remote display devices may be located throughout the home, for example, in a nearby garage, office, barn, boat, and/or on the user (e.g., the watch 202 in FIG. 4).

In an additional embodiment of the disclosure, the receiver 400 may also be configured to plug into a cradle. The cradle will keep the receiver 400 always charged such as is common for home phones. In this manner, the user may simply take the device to a soccer game, swimming match, or boating outing. Thus, the alerts may be available at different locations when needed. The receiver 400 may also be configured to provide a radio, alarm clock, indoor and outdoor temperature and min/max temperatures. In one embodiment, the receiver 400 may be configured with a similar form factor to a PDA or so called "blackberry" like device, see, e.g., FIG. 2.

In still further embodiments of the disclosure, once the receiver 300 is removed from the cradle, it may be configured to turn on or off certain function such as the receipt of outdoor temperature and/or the feeding of data to remote weather display devices.

In still further embodiments of the disclosure, a user may choose a particular weather radio tower that is closest to a user's location or one that has the strongest signal and the display can be configured to display the name and location of the tower selected.

In additional aspects of the disclosure, the weather radio tower may be selected using a combination of the signal strength indicator (e.g., Radio Signal Strength Indicator (RSSI)) from the transmitter/receiver 411 and/or a measurement of the signal to noise ratio of the signal as calculated by, for example, microprocessor 401. In this way, for example, a weaker but low noise signal may be selected over a very strong, but very high noise signal. Hence the user may be potentially provided with a preferred or optimal signal. In still further embodiments, two or more signal icons will be displayed on the display 332/402 with the user able to select between the icons.

In further embodiments, the user is provided with various predetermined profiles on screen 332. In this way, the user programming of the NOAA-broadcasted Specific Area Messaging Encoding (SAME) profiles are simplified to allow a user to select which counties and alerts the user is interested in viewing/hearing by scrolling through the screen. The user can simply scroll through the default profiles such as a travel profile, a home profile, a boating profile, a freeze profile, a tornado profile, a vacation home profile, and a hurricane profile. In some examples, a user can simply select the profile and all criteria associated with the selected profile will be set automatically.

As will be appreciated by one of skill in the art upon reading the following disclosure, various aspects described herein may be embodied as methods, systems, apparatus, and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Computer executable instructions and data used by the processor(s) and other components of the computer system may be stored in a storage facility such as a memory. The memory may comprise any type or combination of read only memory (ROM) modules or random access memory (RAM) modules, including both volatile and nonvolatile memory such as disks. The software may be stored within the memory to provide instructions to the processor(s) such that when the instructions are executed, the processor(s), the receiver and/or other components are caused to perform various functions or methods such as those described herein. Computer executable instructions and data may further be stored on computer readable media including electrically erasable programmable read-only memory (EEPROM), flash memory or other memory technology, CD-ROM, DVD or other optical disk storage, magnetic cassettes, magnetic tape, magnetic storage and the like, and/or any combination thereof The present disclosure has been described in terms of preferred and illustrative embodiments thereof. Numerous other embodiments, modifications and variations within the scope and spirit of the appended claims will occur to persons of ordinary skill in the art from a review of this disclosure. For example, while a single microprocessor is shown in the accompanying drawings, one or more microprocessors may be utilized. Further, any type of microprocessor may be utilized and are interchangeable including computers, microcontrollers, Application-Specific Integrated Circuits (ASICs), Field Programmable Gate Arrays (FPGAs), and other computing devices.

We claim:

1. A method of receiving and recording radio-broadcasted alerts, the method comprising:
   monitoring a radio broadcast;
   detecting an indication on the radio broadcast and identifying the indication as an indication preceding one or more alerts;
   receiving the one or more alerts following the indication, wherein a first alert of the one or more alerts comprises a first set of GPS coordinates;
   determining a first alert type of the first alert;
   determining a second set of GPS coordinates corresponding to the location of a local GPS module;
   receiving a user selection of one or more desired alert types;
   comparing the first and second sets of GPS coordinates;
   comparing the first alert type of the first alert to the one or more user-selected alert types;
   storing the first alert in a memory based on (1) the comparison of the first and second sets of GPS coordinates, and (2) the comparison of the first alert type of the first alert to the one or more user-selected alert types; and
   replaying the first stored alert according to user-inputted instructions received via a user interface.

2. The method of claim 1, wherein the radio broadcast is an NOAA broadcast and the one or more alerts are NOAA alerts.

3. The method of claim 1, wherein the one or more received alerts comprises a weather alert, the method further comprising:
   receiving data corresponding to a location and displaying a map indicating the location on a display screen; and
   displaying one or more storm path indicators based on received weather alert on the display screen.

4. The method of claim 1, further comprising:
   displaying on a display screen a graphical representation of the one or more alerts;
   receiving a selection of a first graphical representation corresponding to a first of the one or more alerts; and
   based on the received selection, replaying the first of the one or more alerts.

5. The method of claim 1, further comprising:
   receiving user input comprising one or more zip codes; and
   filtering the radio broadcasts to receive only alerts corresponding the one or more zip codes.

6. The method of claim 5, wherein the one or more alerts comprises a first alert corresponding to a first zip code of the one or more zip codes and a second alert corresponding to a second zip code of the one or more zip codes, the method further comprising:

displaying the first and second zip codes and a graphical representation of the first and second alerts corresponding to the first and second zip codes on a display screen;

receiving a selection corresponding to one of the first zip code and the second zip code; and replaying the alert corresponding to the selected zip code.

7. The method of claim 1, further comprising:

transmitting the one or more alerts to a proximately located remote device.

8. The method of claim 7, further comprising:

receiving local weather data from the proximately located remote device.

9. A method of receiving and recording radio-broadcasted alerts, the method comprising:

determining, by a radio alert receiver apparatus comprising a processor, a length of a tone or other indication in a radio broadcast preceding a desired alert type;

configuring, by the radio alert receiver apparatus, the processor to turn on and off according to a periodic schedule based on the determined length of the tone or other indication, said processor configured to monitor one or more radio broadcasts when turned on;

detecting at the processor an indication preceding one or more alerts of the desired alert type;

based on said detecting, transmitting a first instruction to the processor to remain on contrary to the periodic schedule, receiving at the processor one or more alerts following the indication;

recording and storing the received one or more alerts; and transmitting a second instruction to the processor to resume the periodic schedule, following the one or more alerts.

10. The method of claim 9, wherein the one or more radio broadcast are NOAA broadcasts and the one or more alerts are NOAA alerts.

11. An apparatus configured to receive and record radio-broadcasted alerts, the apparatus comprising:

a processor controlling at least some of the operations of the apparatus;

a GPS module configured to determine a first set of GPS coordinates corresponding to the location of the apparatus; and a memory storing computer executable instructions that, when executed, cause the apparatus to:

monitor a radio broadcast;

detect an indication on the radio broadcast and identify the indication as an indication preceding one or more alerts;

receive the one or more alerts following the indication;

determine a second set of GPS coordinates associated with a first alert of the one or more alerts;

determine a first alert type of the first alert;

receive a user selection of one or more desired alert types;

compare the first and second sets of GPS coordinates;

compare the first alert type of the first alert to the one or more user-selected alert types;

store the first received alert in the memory of the apparatus based on (1) the comparison of the first and second sets of GPS coordinates, and (2) the comparison of the first alert type of the first alert to the one or more user-selected alert types; and replay the first stored alert according to user-inputted instructions received via a user interface.

12. The apparatus of claim 11, further comprising a receiver configured to receive NOAA radio frequencies.

13. The apparatus of claim 11, further comprising:

a rechargeable power supply configured to interface with a cradle to charge the rechargeable power supply.

14. The apparatus of claim 13, wherein the computer executable instructions, when executed, further cause the apparatus to:

determine that the apparatus has been removed from the cradle; and in response to determining that the apparatus has been removed from the cradle, enable one or more functional features of the apparatus and disable one or more additional functional features of the apparatus.

15. A method of receiving and recording radio-broadcasted alerts, the method comprising:

monitoring a radio broadcast, wherein monitoring the radio broadcast comprises:

detecting the radio broadcast from a plurality of broadcast towers;

displaying a plurality of graphical representations corresponding to the plurality of broadcast towers on a display screen;

receiving input selecting one of the plurality of graphical representations;

identifying a first broadcast tower corresponding to the received input; and monitoring the radio broadcast from the first broadcast tower;

detecting an indication on the radio broadcast from the first broadcast tower, and identifying the indication as an indication preceding one or more alerts;

receiving the one or more alerts from the first broadcast tower, following the indication;

storing the one or more received alerts in a memory; and replaying the one or more stored alerts according to user-inputted instructions received via a user interface.

16. The method of claim 15, wherein the radio broadcast is an NOAA broadcast and the one or more alerts are NOAA alerts.

17. The method of claim 16, further comprising:

determining one or more alert types associated with the one or more alerts received;

determining a user indication type based on said one or more alert types; and providing a user indication that the one or more alerts have been stored, wherein the user indication provided corresponds to the determined user indication type.

18. A method of receiving and recording radio-broadcasted alerts, the method comprising:

monitoring a radio broadcast, wherein monitoring the radio broadcast comprises:

detecting the radio broadcast from a plurality of broadcast towers;

for each of the plurality of broadcast towers, calculating a variable based on a strength of a signal from said broadcast tower and a signal to noise ratio of the signal from said broadcast tower;

selecting a first broadcast tower based on said calculations for the plurality of broadcast towers; and monitoring the radio broadcast from the first broadcast tower;

detecting an indication on the radio broadcast from the first broadcast tower, and identifying the indication as an indication preceding one or more alerts;

receiving the one or more alerts from the first broadcast tower, following the indication;

storing the one or more received alerts in a memory; and replaying the one or more stored alerts according to user-inputted instructions received via a user interface.

19. The method of claim 18, wherein the radio broadcast is an NOAA broadcast and the one or more alerts are NOAA alerts.

20. The method of claim 19, further comprising:

determining one or more alert types associated with the one or more alerts received;

determining a user indication type based on said one or more alert types; and providing a user indication that the one or more alerts have been stored, wherein the user indication provided corresponds to the determined user indication type.

* * * * *